(12) United States Patent
Ghoneim et al.

(10) Patent No.: US 7,493,201 B2
(45) Date of Patent: Feb. 17, 2009

(54) METHOD AND APPARATUS FOR CONTROLLING ACTIVE FRONT STEERING

(75) Inventors: Youssef A. Ghoneim, Macomb Township, MI (US); Robert R. Bolio, Clarkston, MI (US); Matthew M. Karaba, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 893 days.

(21) Appl. No.: 10/978,982

(22) Filed: Nov. 1, 2004

(65) Prior Publication Data
US 2006/0058935 A1 Mar. 16, 2006

Related U.S. Application Data

(60) Provisional application No. 60/610,390, filed on Sep. 16, 2004.

(51) Int. Cl.
*G06F 19/00* (2006.01)
(52) U.S. Cl. ......................... 701/41; 180/443
(58) Field of Classification Search ............ 701/80, 701/37, 41, 48, 70, 77, 78, 71, 74; 180/443; 303/112, 113.2
See application file for complete search history.

(56) References Cited

U.S. PATENT DOCUMENTS

| | | | |
|---|---|---|---|
| 5,720,533 A | 2/1998 | Pastor et al. | |
| 5,746,486 A | 5/1998 | Paul et al. | |
| 5,774,819 A * | 6/1998 | Yamamoto et al. | 701/41 |
| 5,941,919 A | 8/1999 | Pastor et al. | |
| 5,948,027 A * | 9/1999 | Oliver et al. | 701/37 |
| 6,056,371 A | 5/2000 | Lin et al. | |
| 6,453,226 B1 * | 9/2002 | Hac et al. | 701/48 |
| 6,546,324 B1 * | 4/2003 | Chen et al. | 701/48 |
| 6,823,245 B2 * | 11/2004 | Sugitani et al. | 701/29 |

* cited by examiner

*Primary Examiner*—Dalena Tran

(57) ABSTRACT

An active front wheel steering control system for a vehicle that includes a first control sub-system that provides AFS oversteer control to control the angle of the front wheels during an oversteer condition, and a second control sub-system that provides AFS understeer control to control the angle of the front wheels during an understeer condition. A controller monitors a first parameter as an oversteer flag associated with the first control sub-system and a second parameter as an understeer flag associated with the second control sub-system.

27 Claims, 3 Drawing Sheets

METHOD AND APPARATUS FOR CONTROLLING ACTIVE FRONT STEERING

CROSS-REFERENCE TO RELATED APPLICATIONS

This application claims the benefit of the filing date of U.S. Provisional Application Ser. No. 60/610,390, filed Sep. 16, 2004, titled Method and Apparatus for Controlling Active Front Steering.

BACKGROUND OF THE INVENTION

1. Field of the Invention

This invention relates generally to a method and apparatus for controlling an active front steering (AFS) system of a vehicle and, more particularly, to a method and apparatus for controlling an AFS system of a vehicle, where the method determines whether the vehicle steering is in an understeer or oversteer condition.

2. Discussion of the Related Art

Modern vehicles sometimes incorporate active vehicle control sub-systems. One such sub-system is known as a vehicle stability enhancement (VSE) system that assists the vehicle operator in providing vehicle handling on surfaces such as wet or uneven pavement, ice, snow or gravel. The VSE system typically senses wheel skid based on inputs from a wheel speed sensor, a steering angle sensor, vehicle speed and a yaw rate sensor. The VSE system uses these inputs to reduce engine torque and apply vehicle braking to help maintain the vehicle travel along the intended path. In a severe maneuver, the VSE system could considerably slow down the vehicle and may lead to shorter tire life.

Another active vehicle control sub-system is known as an active front steering (AFS) system for providing automatic front-wheel steering. AFS systems typically employ a steering actuator system that receives an operator intended steering signal from a hand wheel sensor, a vehicle speed signal and a vehicle yaw rate signal, and provides a correction to the operator steering signal to cause the vehicle to help more closely follow the vehicle operator's intended steering path to increase vehicle stability and handling. The AFS system is able to provide steering corrections much quicker than the vehicle operator's reaction time, so that the amount of operator steering is reduced.

The AFS system operates in conjunction with a variable gear ratio (VGR) system that changes the steering signal gear ratio for different vehicle speeds. In addition to the VGR system control, the AFS system can be used to provide a very effective technique for stabilizing the vehicle. The AFS system provides a more direct vehicle steering under normal road conditions at low and medium speeds, reducing operator steering effort. The AFS system also may help to increase vehicle agility in city traffic or during parking maneuvers. The AFS system provides a less direct vehicle steering at higher vehicle speeds.

Some AFS system designs incorporate yaw rate measurements and use proportional and derivative yaw rate feedback to generate an additional steering input to the front wheels. One proposed AFS system varies the steering ratio based on the intended steering angle, the vehicle speed and the road conditions.

In a given operating environment, steering stability and performance of a vehicle is largely characterized by its understeer and oversteer behavior. The vehicle is in an understeer condition if the vehicle yaw is less than the operator steering input, where turning the steering wheel more does not correct the understeer condition because the wheels are saturated. The vehicle is in an oversteer condition if the vehicle yaw is greater than the operator steering input.

Under certain scenarios the additional steering input to the front wheels provided by the AFS system can saturate the front tires during a heavy understeer condition resulting in an undesired vehicle behavior. Therefore, it is desirable to determine the understeer and oversteer behavior of the vehicle and to change the AFS control strategy based on the understeer and oversteer behavior of the vehicle so that the road wheel steering angle is in the ideal position to provide the intended steering angle.

SUMMARY OF THE INVENTION

In accordance with the teachings of the present invention, an AFS control system is disclosed that includes a first control sub-system that provides AFS oversteer control to control the angle of the front wheels during an oversteer condition, and a second control sub-system that provides AFS understeer control to control the angle of the front wheels during an understeer condition. A controller monitors a first parameter as an oversteer flag associated with the first control sub-system and monitors a second parameter as an understeer flag associated with the second control sub-system.

In one embodiment, the AFS control system includes a control algorithm that determines a yaw rate command signal based on a steering command signal and a vehicle speed signal, determines a yaw rate error signal as the difference between the yaw rate command signal and an actual vehicle yaw rate signal and determines a derivative of the yaw rate error signal. The algorithm further determines an understeer and oversteer condition of the vehicle based on the steering command signal, the actual yaw rate signal, the vehicle speed signal and a lateral acceleration signal. The algorithm also determines an understeer flag and oversteer flag based on the understeer and oversteer behavior condition, and determines a vehicle understeer control and a vehicle oversteer control based on the understeer and oversteer flags. The algorithm then determines a front steering feedback control signal based on the understeer control and the oversteer control, and combines the front steering feedback control signal and the steering command signal to provide an active front steering.

The oversteer control and the understeer control are determined based on a PID control including a proportional term, a derivative term and an integral term. The proportional term is determined by multiplying a proportional gain by the yaw rate error signal, the derivative term is determined by multiplying a derivative gain by a yaw acceleration error signal and the integral term is determined by multiplying an integral gain by a vehicle yaw angle. The algorithm further determines dead band regions between the actual vehicle yaw rate and the steering command signal where no active front wheel steering is provided.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to an active front steering system that monitors vehicle understeer and oversteer behavior is merely exemplary in nature, and is in no way intended to limit the invention or its applications or uses.

As will be discussed in detail below, the present invention includes an AFS control system having an AFS oversteer control for controlling the angle of the front wheels of the vehicle during an oversteer condition and having an AFS understeer control for controlling the angle of the front wheels of the vehicle during an understeer condition. A controller monitors an oversteer flag associated with the AFS oversteer control and an understeer flag associated with the AFS understeer control.

The AFS control system of the present invention has advantages over known AFS control system and methods, particularly systems that are based on yaw rate error, because it provides an appropriate control for the AFS system based on the understeer/oversteer behavior of the vehicle. Particularly, the system enables the real time adjustment of the steering in accordance with understeer and oversteer flags described below. In the known systems, during an understeer maneuver without the understeer information, the AFS control based on yaw rate error defined what the difference between a desired yaw rate from the driver steering input, and the actual yaw rate of the vehicle to provide an additive steering input to the front wheels of the vehicle that could saturate the front tires, and hence deteriorate the overall performance of the vehicle under the AFS control. In the present invention, adding the understeer and oversteer flag information results in a reduction of the steering input to the front wheels during a heavy understeer maneuver, thus reducing the vehicle understeer and enhancing the vehicle stability, especially when a VSE system is provided on the vehicle. For the present invention, reducing the understeer effect by controlling the AFS during an understeer condition will reduce the amount of control contributed by the VSE to reduce the vehicle understeer.

Figure 1:
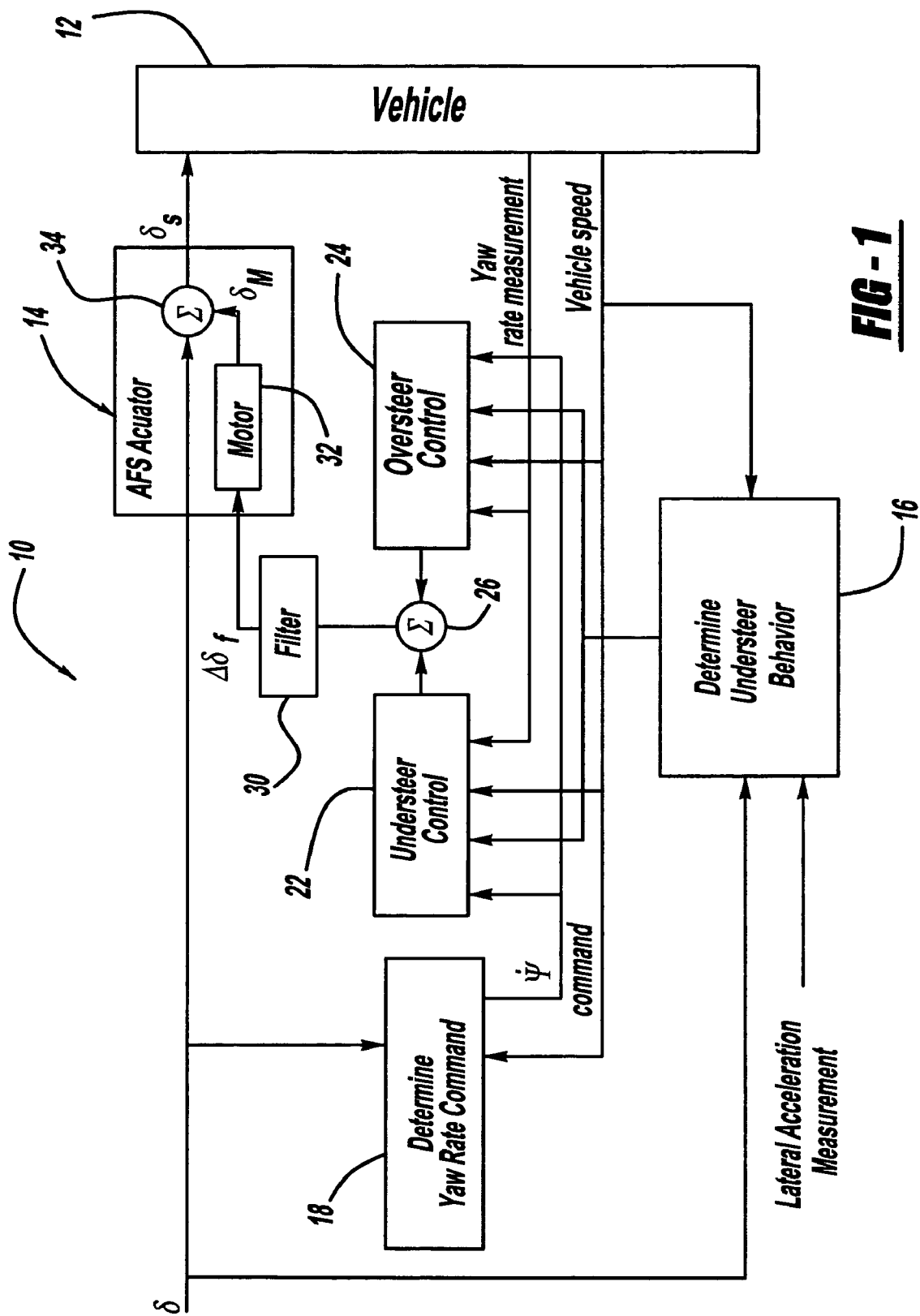
FIG. 1 is a block diagram of an active front steering system for a vehicle, according to an embodiment of the invention.

FIG. 1 is a general block diagram of an AFS control system 10 for a vehicle 12, according to an embodiment of the present invention. The system 10 includes an AFS actuator 14 that receives a steering command signal $\delta$ from a sensor sensing the position of the steering hand-wheel indicating the vehicle operator's intended steering angle, and provides a front wheel steering control signal $\delta_s$ to the vehicle 12 to steer the vehicle 12. The system 10 also includes an understeer behavior process block 16 and a yaw rate command process block 18 both of which also receive the steering command signal $\delta$. The vehicle 12 includes a yaw rate sensor for measuring the yaw rate of the vehicle 12, a vehicle speed sensor for determining the vehicle speed of the vehicle 12, and a lateral acceleration sensor for measuring the lateral acceleration of the vehicle 12. The understeer behavior process block 16 also receives the vehicle speed signal and the lateral acceleration signal, and generates an understeer flag and an oversteer flag, discussed below.

The yaw rate command process block 18 also receives the vehicle speed signal and generates a yaw rate command signal $\psi_{compound}$. An understeer control process block 22 receives the yaw rate command signal $\psi_{command}$ from the yaw rate command process block 18, the vehicle speed signal and the vehicle yaw rate signal. The understeer process block 22 determines an error between the commanded vehicle yaw rate and the actual vehicle yaw rate. Likewise, an oversteer control process block 24 receives the yaw rate command signal $\psi_{command}$, the vehicle yaw rate signal and the vehicle speed signal. The oversteer process block 24 also determines an error between the commanded vehicle yaw rate and the actual vehicle yaw rate. The understeer process block 22 receives the understeer and oversteer flags from the process block 16 and generates an understeer control signal $\Delta\delta_{understeer}$ of the vehicle 12, discussed below. The oversteer process block 24 receives the understeer and oversteer flags from the process block 16 and generates an oversteer control signal $\Delta\delta_{oversteer}$ of the vehicle 12, discussed below.

The understeer and oversteer control signals $\Delta\delta_{understeer}$ and $\Delta\delta_{oversteer}$ are summed together by a summer 26 and the summed signal is filtered by a first order low pass filter 30, for example about 26 Hz, to provide a steering command signal $\Delta\delta_f$. The steering command signal $\Delta\delta_f$ is applied to a motor 32 in the AFS actuator 14 that generates a steering motor signal $\delta_M$. The steering command signal $\delta$ and the motor signal $\delta_M$ are applied to a summer 34 in the actuator 14 that generates the steering control signal $\delta_s$ that is applied to the vehicle steering gear.

According to the invention, a two degree-of-freedom model is used to develop an additional steering input command to the front wheels for the AFS control, determine the vehicle understeer behavior and determine the final additional steering inputs to the vehicle's front wheels. The design of the vehicle yaw rate correction for the AFS system is generated by the vehicle yaw-plane dynamics. While the vehicle 12 is undergoing handling maneuvers, it not only incurs a yaw motion, but it also experiences a side-slip motion at the same time. The yaw-plane dynamics determine the performance of the vehicle yaw motion characterized by the vehicle yaw rate, as well as the lateral motion characterized by the side slip velocity.

The following nomenclature will be used in the discussion and equations below:

a is the distance from the center of gravity of the vehicle 12 to the front axle (m);

b is the distance from the center of gravity of the vehicle 12 to the rear axle (m);

$C_f$ is the cornering stiffness of both tires of the front axle (N/rad);

$C_r$ is the cornering stiffness of both tires of the rear axle (N/rad);

$I_z$ is the moment of inertia of the vehicle 12 about the yaw axis (kgm$^2$);

M is the total vehicle mass (kg);

$v_y$ is the lateral velocity of the vehicle's center of gravity (m/s);

$v_{yd}$ is the desired lateral velocity of the vehicle's center of gravity (m/s);

$v_x$ is the longitudinal velocity of the vehicle's center of gravity (m/s);

$\delta$ is the steering angle of the front wheels (rad);

$\psi$ is the yaw rate of the vehicle 12 (rad/s); and $\psi_d$ is the desired yaw rate of the vehicle 12 (rad/s).

The vehicle yaw-plane dynamics can be described by a second-order state equation as:

$$M(\dot{v}_y + v_x \psi) = F_{yf} + F_{yr} \quad (1)$$

$$I_z \ddot{\psi} = aF_{yf} - bF_{yr} \quad (2)$$

Where, $$F_{yf} = C_f a_f \quad (3)$$

$$F_{yr} = C_r a_r \quad (4)$$

The front slip angle $\alpha_f$ and the rear slip angles $\alpha_r$ obey the following relationship:

$$\alpha_f = (\delta + \Delta\delta_f) - \frac{v_y + a\dot\psi}{v_x} \quad (5)$$

$$\alpha_r = \frac{v_y + b\dot\psi}{v_x} \quad (6)$$

$\Delta\delta_f$ is the additional front-wheel steer angle due to the feedback control.

Substituting the equations (5) and (6) into the equations (1) and (2) and defining additional steering input command to the front wheels $\Delta\delta_f$ gives:

$$\begin{bmatrix} \dot v_y \\ \ddot\psi \end{bmatrix} = \begin{bmatrix} -\frac{C_f + C_r}{Mv_x} & -\frac{aC_f - bC_r}{Mv_x} v_x \\ -\frac{aC_f - bC_r}{I_z v_x} & -\frac{a^2 C_f + b^2 C_r}{I_z v_x} \end{bmatrix} \begin{bmatrix} v_y \\ \dot\psi \end{bmatrix} + \begin{bmatrix} \frac{C_f}{M} \\ \frac{aC_f}{I_z} \end{bmatrix} \delta + \begin{bmatrix} \frac{C_f}{M} \\ \frac{aC_f}{I_z} \end{bmatrix} \Delta\delta_f \quad (7)$$

The yaw plane just described can be used to generate control laws for both braking and steering yaw moment corrections.

The dynamics of the desired vehicle performance is described by:

$$\begin{bmatrix} \dot v_{yd} \\ \ddot\psi_d \end{bmatrix} = \begin{bmatrix} -\frac{C_f + C_r}{Mv_x} & -\frac{aC_f - bC_r}{Mv_x} - v_x \\ -\frac{aC_f - bC_r}{I_z v_x} & -\frac{a^2 C_f + b^2 C_r}{I_z v_x} \end{bmatrix} \begin{bmatrix} v_{yd} \\ \dot\psi_d \end{bmatrix} + \begin{bmatrix} \frac{C_f}{M} \\ \frac{aC_f}{I_z} \end{bmatrix} \delta \quad (8)$$

The errors are defined as:

$$\Delta v_y = v_y - v_{yd} \quad (9)$$

$$\Delta\dot\psi = \dot\psi - \dot\psi_d \quad (10)$$

Define the following parameters:

$$a_{11} = -\frac{C_f + C_r}{M} \quad (11)$$

$$a_{21} = \frac{-aC_f + bC_r}{I_z} \quad (12)$$

$$a_{12} = \frac{-aC_f + bC_r}{M} \quad (13)$$

$$a_{22} = \frac{-a^2 C_f + b^2 C_r}{I_z} \quad (14)$$

Subtracting the equation (8) from the equation (7) results in the dynamic equation of system errors:

$$\begin{bmatrix} \Delta\dot v_y \\ \Delta\ddot\psi \end{bmatrix} = \begin{bmatrix} \frac{a_{11}}{v_x} & \frac{a_{12}}{v_x} - v_x \\ \frac{a_{21}}{I v_x} & \frac{a_{22}}{v_x} \end{bmatrix} \begin{bmatrix} \Delta v_y \\ \Delta\dot\psi \end{bmatrix} + \begin{bmatrix} \frac{C_f}{M} \\ \frac{aC_f}{I_z} \end{bmatrix} \Delta\delta_f \quad (15)$$

The system is defined to include the integral action:

$$\begin{bmatrix} \Delta\dot v_y \\ \Delta\ddot\psi \\ \Delta\dot\psi \end{bmatrix} = \begin{bmatrix} \frac{a_{11}}{v_x} & \frac{a_{12}}{v_x} - v_x & 0 \\ \frac{a_{21}}{I v_x} & \frac{a_{22}}{v_x} & 0 \\ 0 & 1 & 0 \end{bmatrix} \begin{bmatrix} \Delta v_y \\ \Delta\dot\psi \\ \int \Delta\dot\psi \end{bmatrix} + \begin{bmatrix} \frac{C_f}{M} \\ \frac{aC_f}{I_z} \\ 0 \end{bmatrix} \Delta\delta_f \quad (16)$$

$$\Downarrow$$

$$\dot x = Ax + Bu$$

The measurement error vector is given by:

$$[\Delta_y] = \begin{bmatrix} 0 & 1 & 0 \\ 0 & 0 & 1 \end{bmatrix} \begin{bmatrix} \Delta v_y \\ \Delta\dot\psi \\ \int \Delta\dot\psi \end{bmatrix} \quad (17)$$

$$\Downarrow$$

$$\Delta_y = Cx$$

The yaw rate of the vehicle 12 is the only information available for the design of the AFS control. A proportional and integral control is first designed so that the control law proposed will converge on the surface defined by:

$$S = G_1 \Delta\dot\psi + G_2 \int \Delta\dot\psi \quad (18)$$

i.e. $S=0$

Where $G_1$ and $G_2$ are positive constants (design parameters).

For the convergency of the control law on the surface $S=0$, the following conditions are defined:

$$\text{Lim}\dot S < 0$$

$$S \to 0^+ \quad (19)$$

$$\text{Lim}\dot S > 0$$

$$S \to 0^- \quad (20)$$

Where $\dot S$ is the derivative of S. The equations (19) and (20) insure that the motion of the state $$z = \begin{bmatrix} \Delta\dot\psi \\ \int \Delta\dot\psi \end{bmatrix}$$

on either side of the surface $S=0$ is in the neighborhood of the surface. The two conditions may be combined to give the following reaching condition:

$$S^T \dot S \leq 0 \quad (21)$$

The control proportional and integral terms take the form:

$$\Delta \delta_{fPI} = -\frac{1}{\frac{aC_f}{I_z}}\left\{\left(a_{22} - \frac{1}{a^2 G_1^2} + \xi - \frac{G_2}{G_1}\right)\Delta\dot{\psi} + \xi\frac{G_2}{G_1}\int \Delta\dot{\psi}\right\} \quad (22)$$

The derivative term is a ratio of the proportional term. This ratio is a design parameter depending on the AFS actuator dynamics, and the system sensitivity to parameter uncertainty. The final PID control takes the form:

$$\Delta\delta_f = \left\{K_p \Delta\dot{\psi} + K_i \int \Delta\dot{\psi} + K_d \Delta\ddot{\psi}\right\} \quad (23)$$

Where, $$K_p = -\frac{1}{\frac{aC_f}{I_z}}\left(a_{22} - \frac{1}{a^2 G_1^2} + \xi - \frac{G_2}{G_1}\right) \quad (24)$$

$$K_i = -\frac{1}{\frac{aC_f}{I_z}}\xi\frac{G_2}{G_1} \quad (25)$$

$$K_d = -\frac{1}{\frac{aC_f}{I_z}}K_{dr}\left(a_{22} - \frac{1}{a^2 G_1^2} + \xi - \frac{G_2}{G_1}\right) \quad (26)$$

Where $K_p$, $K_i$ and $K_d$ are the proportional, integral and derivative terms, respectively, $K_{dr}$ is a positive number less than 1, and $\Delta\ddot{\psi}$ is the time derivative of the yaw-rate-error $\Delta\dot{\psi}$.

Figure 2:
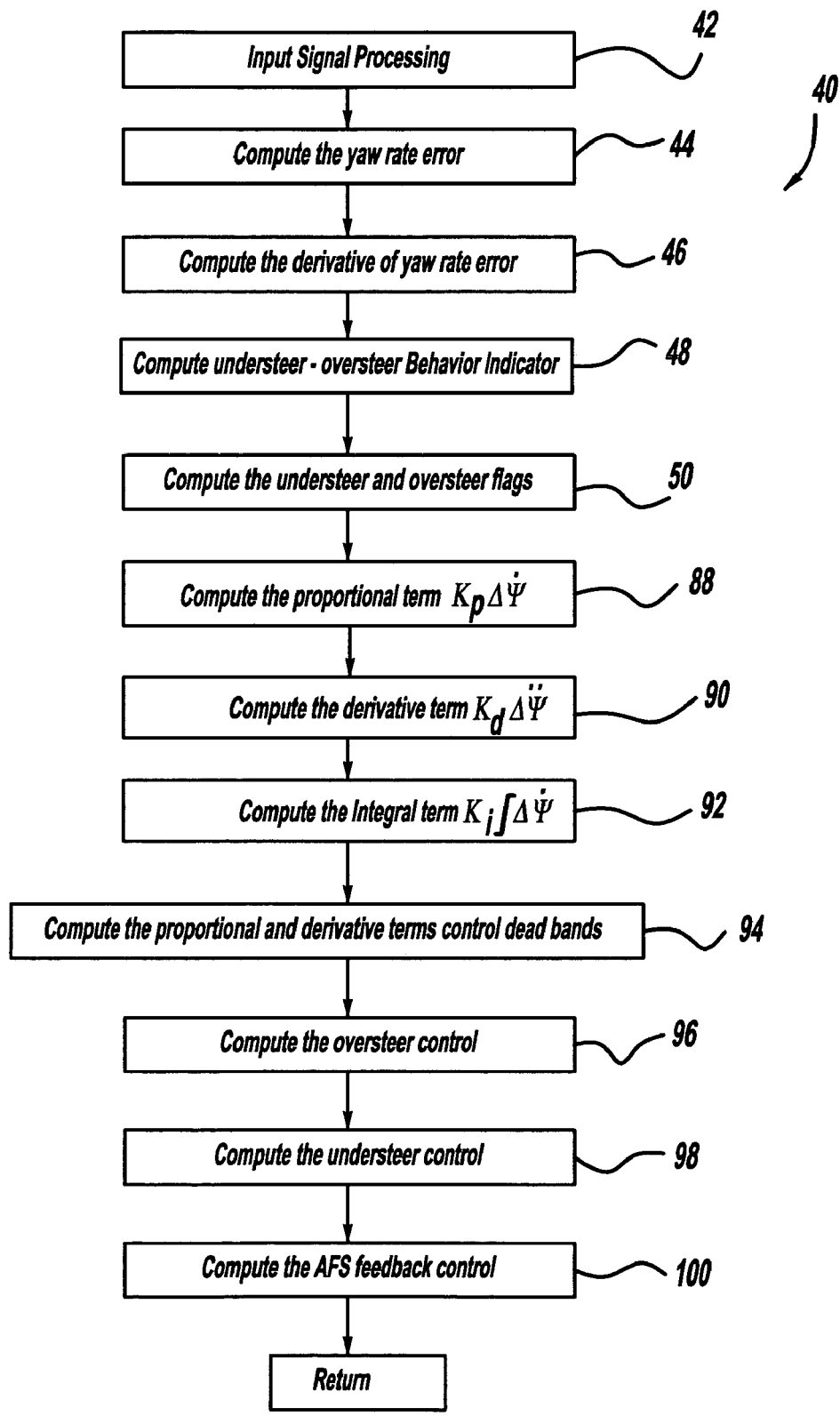
FIG. 2 is a flow chart diagram showing the operation of the active front steering system of the invention.

FIG. 2 is a flow chart diagram 40 showing the operation of the control algorithm for determining the steering control signal $\delta_s$ considering both understeer and oversteer behavior in the system 10, according to one embodiment of the present invention. The steering command signal $\delta$, the yaw rate command signal $\psi$ and the vehicle speed signal are processed at box 42.

The control algorithm then computes a yaw rate error signal at box 44 as:

$$\Delta\psi = \psi_{command} - \psi \quad (27)$$

Any suitable technique can be used to determine the yaw rate command signal $\psi$. For example, U.S. Pat. Nos. 5,720,533; 5,746,486 and 5,941,919, assigned to the assignee of the present application and herein incorporated by reference, disclose exemplary methods for determining the yaw rate command signal command $\psi_{command}$. The control algorithm filters the yaw rate error through the low pass filter 30 having a bandwidth, for example, of about 26 Hz.

The control algorithm then computes the derivative of the yaw rate error $$(\Delta\dot{\psi}\text{deg/sec}*2)$$

at box 46 as:

$$t1 = 2*\xi*(2*\pi*fn); \quad (28)$$

$$t2 = (2*\pi*fn)^2; \quad (29)$$

$$\Delta\dot{\psi}\_est(k) = (1-T*g1)*\Delta\dot{\psi}r\_est(k-1) + T*t1*\Delta\psi(k) + T*\Delta\ddot{\psi}(k-1); \text{ and} \quad (30)$$

$$\Delta\ddot{\psi}(k) = \Delta\ddot{\psi}(k-1) + T*t2*(\Delta\psi(k) - \Delta\psi\_est(k)) \quad (31)$$

Where, fn is the frequency coefficient, for example, 2 Hertz;

$\xi$ is the damping coefficient, for example, 0.707;

T is the control sampling time interval, for example, 10 milliseconds (msec);

k is the control sampling time;

$\Delta\psi(k)$ is the vehicle yaw rate error at time step k;

$\Delta\dot{\psi}\_est$ is the estimated vehicle yaw rate error;

$\Delta\dot{\psi}\_est(k)$ estimated vehicle yaw rate error at time step k;

$\Delta\dot{\psi}\_est(k-1)$ is the estimated vehicle yaw rate error at prior time step (k-1); and $\Delta\ddot{\psi}(k)$ is the estimated derivative of vehicle yaw rate error at time step k.

The control algorithm then computes an understeer-oversteer behavior indicator at box 48. An oversteer flag is set high in the default position because oversteer is the most difficult to control. The control algorithm determines an understeer coefficient $K_\mu$ or indicator of the understeer behavior under steady state conditions for the vehicle 12 from the following general steer equation:

$$\delta = \frac{L\dot{\psi}}{V_x} + K_u a_y \quad (32)$$

Where $\delta, L, \dot{\psi}, V_x, a_y$ are the steering angle, the vehicle wheelbase, the vehicle yaw rate, the vehicle speed and the vehicle lateral acceleration, respectively. The equation (32) is based on a two degree-of-freedom bicycle model of a front wheel steer vehicle. The understeer calculation in this case includes the understeer gradient from the nominal cornering stiffness of the tire and the effect of the load transfer.

The equation (32) is valid in the linear range of the tire behavior, when the lateral force generated by the tire is proportional to the tire slip angle, during steady state conditions. Under non-linear tire behavior or during transient state conditions, the general steer equation becomes indeterminate and an understeer-oversteer behavior indicator cannot be determined using this mathematic expression. Therefore, it is desirable to develop a method and apparatus that may be used to characterize the steering behavior of a vehicle under non-linear, transient conditions and that is adapted for use in an integrated chassis control system. The following computations are performed to do this.

Rewrite the general steer equation as:

$$K_u V_x a_y = \delta V_x - L\dot{\psi} \quad (33)$$

Compute the following variables as:

$$y = \delta V_x - L\dot{\psi} \quad (34)$$

$$\xi = a_y V_x \quad (35)$$

Recast the steer equation into:

$$y = \xi K_\mu \quad (36)$$

Compute the estimation error as:

$$\epsilon(k) = y(k) - \xi(k-1)\hat{K}_\mu(k-1) \quad (37)$$

Where $\hat{K}_\mu(k-1)$ is the estimated understeer-oversteer behavior indicator at time (k-1).

Update the estimated understeer-oversteer behavior indicator as:

$$\tilde{K}_\mu(k) = \hat{K}_\mu(k-1) + \frac{P(k-2)\xi(k-1)}{\alpha(k-1) + \xi^2(k-1)P(k-2)} \varepsilon(k) \quad (38)$$

P(k−1) is updated as:

$$P(k-1) = \frac{1}{\alpha(k-1)} \left[ P(k-2) - \frac{P^2(k-2)\xi^2(k-1)}{a(k-1) + \xi^2(k-1)P(k-2)} \right] \quad (39)$$

The variable a is a weighting factor. One exemplary description of how to determine the understeer behavior indicator $K_\mu$ is disclosed in the co-pending U.S. patent application Ser. No. 10/812,438, titled Method and Apparatus for Estimating Steering Behavior for Integrated Chassis Control, filed Mar. 30, 2004, assigned to the assignee of the present invention, and herein incorporated by reference. Other suitable methods for determining the understeer behavior indicator can also be used. The computation of the understeer behavior indicator $K_\mu$ is essential for the determining the understeer and oversteer flags, which is described below.

Figure 3:
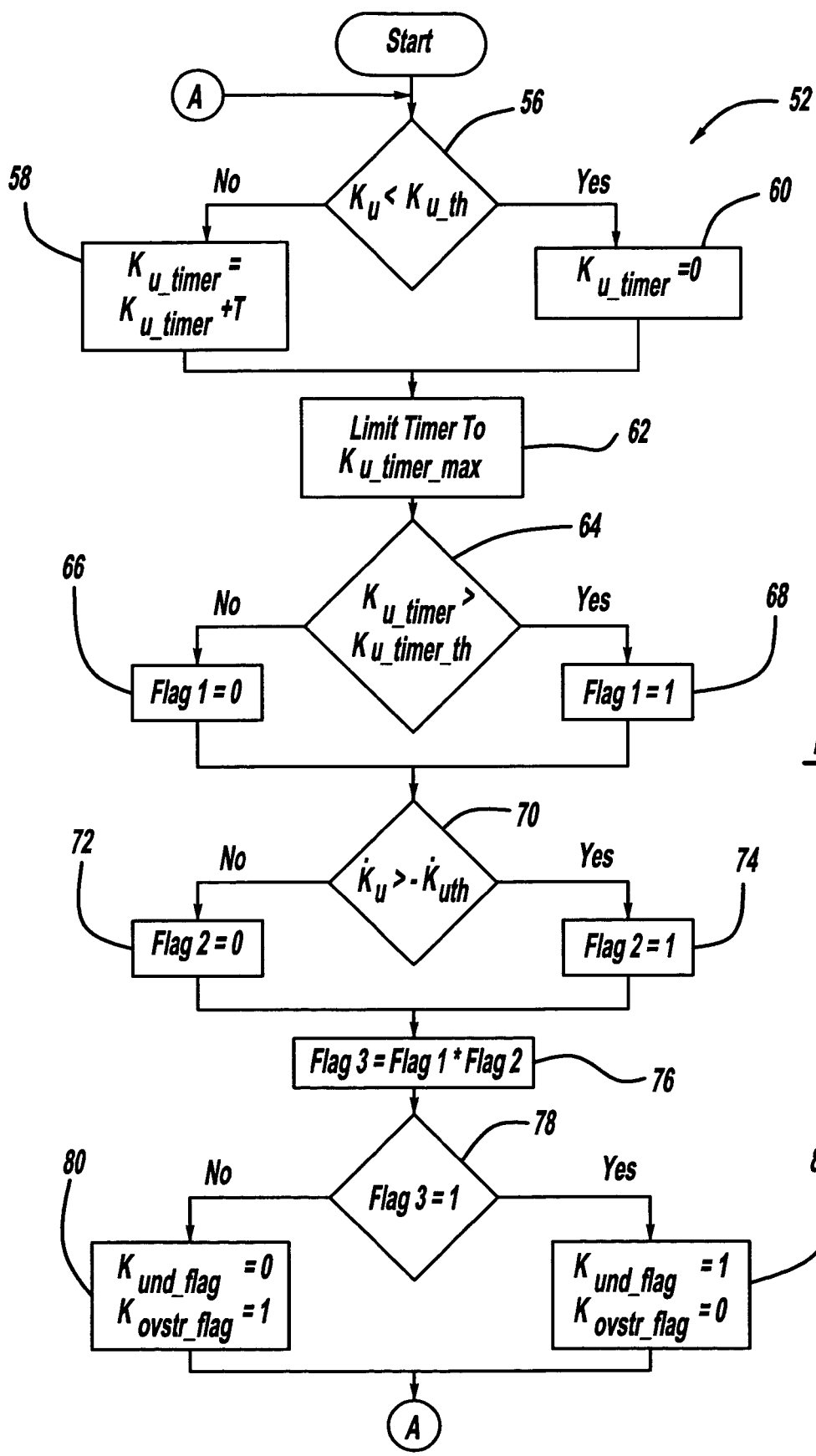
FIG. 3 is a flow chart diagram showing the steps of calculating understeer and oversteer flags during the operation of the active front steering system of the invention.

The control algorithm then computes the understeer and oversteer flags at box 50. FIG. 3 is a flow chart diagram 52 showing the operation of computing the understeer and oversteer flags. The control algorithm first determines the rate of change of the understeer behavior indicator $\dot{K}_u$ as:

$$\dot{K}_u = \frac{dK_\mu}{dt} = \frac{K_\mu(t+T) - K_\mu(t)}{T} \quad (40)$$

Where T is the loop time, for example, 10 msec, $K_\mu(t)$ and $K_\mu(t+T)$ are the understeer behavior indicator at time t and (t+T), respectively. The control algorithm then filters the rate of change of the understeer behavior indicator $\dot{K}_\mu$ using a first order filter.

The control algorithm determines whether $K_u$ is less than $K^u{}_{\_th}$ at decision diamond 56. If $K_u$ is not less than $K_{u\_th}$, then the control algorithm sets $K_{u\_}$ timer equal to $K_{u\_timer}$+T at box 58. If $K_{u\_is\ less\ than\ K^u{}_{\_th}}$ at the decision diamond 56, then the control algorithm sets $K_{u\_timer}$ equal to zero at box 60. The control algorithm then limits the timer $K_{u\_timer}$ to a predetermined maximum at box 62, and determines whether $K_{u\_timer}$ is greater than $K_{u\_timer\_th}$ at decision diamond 64. If $K_{u\_timer}$ is not greater than $K_{u\_timer\_th}$ at the decision diamond 64, then the control algorithm sets a first flag 1 equal to zero at box 66, otherwise the control algorithm sets the first flag 1 equal to one at box 68. The control algorithm then determines whether the derivative of $K_u$ is greater than the negative of the derivative of $K_{u\_th}$ at decision diamond 70. If the derivative of $K_u$ is not greater than the negative of the derivative of $K_{u\_th}$, then the control algorithm sets a second flag 2 equal to zero at box 72, otherwise sets the second flag 2 equal to one at box 74. The control algorithm then sets a third flag 3 equal to the first flag 1 times the second flag 2 at box 76. The control algorithm then determines whether the third flag 3 is equal to one at decision diamond 78. If the third flag 3 is not equal to one at the decision diamond 78, then the control algorithm sets the understeer flag $K_{und\_flag}$ equal to zero and the oversteer flag $K_{ovstr\_flag}$ equal to one at box 80. If the third flag 3 is equal to one at the decision diamond 78, then the control algorithm sets the understeer flag $K_{und\_flag}$ equal to one and the oversteer flag $K_{ovstr\_flag}$ equal to zero at box 82. The control algorithm then returns to the decision diamond 56 to repeat the process.

Following is the control logic for implementing the process of determining the understeer and oversteer flags shown in FIG. 3.

```
If K_μ(t)<K_μ_th
   Then K_μ_timer=0
       Else if K_μ(t)≧K_μ_th
       Then K_μ_timer(t+T)=K_μ_timer(t)+T
Endif
If K_μ_timer≧K_μ_timer_max
   Then K_μ_timer=K_μ_timer_max
Endif
If K_μ_timer≧K_μ_timer_th
   Then Flag 1=1
   Else Flag =0
Endif
If K_μ(t)>K_μ_th
   Then Flag2=1
   Else Flag2=0
Endif
Flag3=Flag1*Flag2
IF Flag3=1
Then
      Kund_flag=1
      Koverstr_flag=0
Else
      Kund_flag=0
      Koverstr_flg=1
```

The control algorithm then determines the proportional term by multiplying the proportional gain by the yaw rate error signal ($K_p\Delta\dot{\psi}$) at box 88. The proportional gain $K_p$ is obtained from a look-up table based on vehicle speed calculated from the equations above. An example of this look-up table is given as:

Input: Vehicle Speed (kph)=[0 10 20 30 40 50 80 100 200]
Output: Proportional Gain $K_p$=[0 0 0.06 0.12 0.18 0.24 0.2 0.08 0.05]

The control algorithm then determines the derivative term by multiplying the derivative gain by the yaw acceleration error signal ($K_d\Delta\ddot{\psi}$) at box 90. The derivative gain $K_d$ is obtained from a look-up table based on vehicle speed. An example of this look-up table is given as:

Input: Vehicle Speed (kph)=[0 8 40 80 100 200]
Output: Proportional Gain $K_d$=[0 0.0 0.0 0.056 0.084 0.112]

The control algorithm then determines the integral term by multiplying the integral gain by the yaw angle ($K_i \int \Delta \dot{\psi}$) at box 92.

The integral gain is obtained by subjecting the integral gain $$K_i = -\frac{1}{\frac{aC_f}{I_z}} \xi \frac{G_2}{G_1}$$

to a diminishing integrator function that reduces the preliminary integral gain term to zero at a predetermined time constant. One exemplary discussion of determining the diminishing integrator is disclosed in U.S. Pat. No. 6,056,371, which is assigned to the assignee of the present invention and is hereby incorporated by reference. Other suitable techniques for determining the diminishing integrator can also be used.

Various parameters, such sensor sensitivities, bumpy road, etc., prevent the commanded yaw rate from exactly matching the actual vehicle yaw rate. Therefore, in order to prevent the AFS system from continually providing steering control for small yaw rate errors, the control algorithm determines dead bands where no active steering control is provided. These control dead bands, defined by degrees in yaw rate error, are based on vehicle speed. The control algorithm computes proportional and derivative term control dead bands at box 94.

The dead band for both the proportional and the derivative terms are determined where the control remains inactive until the dead band exceeds a predetermined threshold. The dead band for the proportional term is obtained from a look-up table based on vehicle speed. An example of this look-up table is given as:

Input: Vehicle Speed (kph)=[0 10 20 30 40 50 80 100 200]
Output: Proportional dead-band (deg/sec)=[6 5 4 4 4 4 4 4 4]

The dead band for the derivative term is obtained from a look-up table based on the yaw acceleration. The output is a Boolean (0,1) that multiplies the derivative gain by the yaw acceleration error signal ($K_d \Delta \ddot{\psi}$). An example of this look-up table is given as:

Input: Yaw Acceleration (deg/sec^2)=[−120 −25 −20 0 20 25 120]
Output: derivative dead band gain $K_{dd}$=[1 1 0 0 0 1 1]

The dead band for the integral term is obtained by integrating the yaw rate error dead band using the diminishing integrator function described above for computing the integral term.

The control algorithm then computes the oversteer control at box 96. If the understeer flag is set to zero and the oversteer flag is set to one, then the understeer control is set to zero and the oversteer control is set to:

$$\{K_p \Delta \psi + K_i \int \Delta \psi + K_d \Delta \ddot{\psi}\} \quad (41)$$

The control algorithm then computes the understeer control at box 98. If the understeer flag is set to one and the oversteer flag is set to zero then the control algorithm sets the oversteer control to zero and sets the understeer control to:

$$-K_{understeer\_gain}\{K_p \Delta \dot{\psi} + K_i \int \Delta \psi + K_d \Delta \ddot{\psi}\} \quad (42)$$

The control algorithm then computes the AFS feedback control at box 100 as:

$$\Delta \delta_f = \Delta \delta_{understeer} + \Delta \delta_{understeer} \quad (43)$$

Careful examination of the understeer control shows that during the understeer control the sign of the control signal is opposite to the oversteer control. The reason as discussed above is to reduce the steering input to the front wheels during a heavy understeer maneuver, thus reducing the vehicle understeer and enhancing the vehicle stability.

The above-described VSE and AFS systems have particular application for the General Motors StabiliTrak 3.0, which features integrated electronic controls for suspension, steering and braking to help the vehicle operator maintain control of the vehicle during the most difficult driving conditions. StabiliTrak 3.0 helps the driver maintain control by electronically comparing what the driver wants the vehicle to do with how the vehicle is actually responding. If the vehicle isn't responding the way the driver wants, or is in danger of spinning or skidding out of control, StabiliTrak 3.0 automatically engages the appropriate suspension, steering and braking controls to stabilize the car and help the driver retain control. StabiliTrak 3.0 provides the driver an increased chance of maintaining control of the vehicle during difficult road conditions, including ice, snow, gravel, wet pavement and emergency lane changes or avoidance maneuvers.

The AFS system helps to provide improved handling and maneuverability through speed-variable gear ratio adjustment. The speed-variable steering gear ratio can help to make parking easier by requiring less steering wheel revolutions. In addition, dart may be reduced for high speed driving.

The VSE system helps to enhance handling and braking dynamics by using a combination of systems and sensors including ABS, traction control, suspension and steering. An array of sensors continually monitor the driver's intended vehicle, measuring steering angle, wheel speed, brake pressure, lateral acceleration, longitudinal acceleration and yaw rate. This information is provided to an electronic control module that continually monitors vehicle dynamics and is programmed for intervention thresholds. The VSE system intervenes when it senses one or more of the wheels slipping, loss of lateral traction (side-slip), or detects an understeer or oversteer condition. The system automatically adjusts road wheel angle, damping characteristics and brake pressure at individual wheels to help maintain the vehicle in the intended path.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing an active front steering for a vehicle, said method comprising:
    providing a vehicle speed signal of the vehicle;
    providing an actual yaw rate signal of the actual yaw rate of the vehicle;
    providing a steering command signal indicative of the vehicle operator's desired steering direction;
    providing a lateral acceleration signal of the lateral acceleration of the vehicle;
    determining a yaw rate command signal based on the steering command signal and the vehicle speed signal;
    determining a yaw rate error signal as the difference between the yaw rate command signal and the actual yaw rate signal;
    determining a derivative of the yaw rate error signal;
    determining an understeer and oversteer condition of the vehicle based on the steering command signal, the actual yaw rate signal, the vehicle speed signal and the lateral acceleration signal;
    determining an understeer flag and an oversteer flag based on the understeer and oversteer behavior condition;
    determining a vehicle understeer control and a vehicle oversteer control based on the understeer and oversteer flags;
    determining a front steering feedback control signal based on the understeer control and the oversteer control;
    combining the front steering feedback control signal and the steering command signal to provide the active front steering; and
    determining dead bands where the method does not provide the feedback control signal if the yaw rate error signal is below a predetermined threshold.

2. The method according to claim 1 wherein determining the oversteer control and the understeer control includes determining a proportional term, a derivative term and an integral term for a proportional-integral-derivative (PID) control.

3. The method according to claim 2 wherein determining the proportional term includes multiplying a proportional gain by the yaw rate error signal, determining the derivative term includes multiplying a derivative gain by a yaw acceleration error signal and determining the integral term includes multiplying an integral gain by a vehicle yaw angle.

4. The method according to claim 3 wherein the proportional gain and the derivative gain are determined from a look-up table based on the vehicle speed signal.

5. The method according to claim 3 wherein determining the integral term further includes subjecting the integral gain to a diminishing integrator function.

6. The method according to claim 3 wherein determining the understeer control includes determining that the understeer flag is high and the oversteer flag is low, and then setting the understeer control to:

$$-K_{understeer\_gain}\{K_p\Delta\dot{\psi}+K_i\int\Delta\dot{\psi}+K_d\Delta\ddot{\psi}\}$$

where $K_{understeer\_gain}$ is the understeer gain, $K_p\Delta\dot{\psi}$ is the proportional term, $K_i\int\Delta\dot{\psi}$ is the integral term and $K_d\Delta\ddot{\psi}$ is the derivative term.

7. The method according to claim 3 wherein determining the oversteer control includes determining that the understeer flag is low and the oversteer flag is high, then setting the oversteer control to:

$$\{K_p\Delta\dot{\psi}+K_i\int\Delta\dot{\psi}+K_d\Delta\ddot{\psi}\}$$

where $K_p\Delta\dot{\psi}$ is the proportional term, $K_i\int\Delta\dot{\psi}$ is the integral term and $K_d\Delta\ddot{\psi}$ is the derivative term.

8. The method according to claim 1 wherein determining the dead band includes determining a proportional term dead band based on vehicle speed, determining a derivative term dead band based on a yaw acceleration of the vehicle and determining an integral term dead band based on integrating a yaw rate error dead band using a diminishing integrator function.

9. The method according to claim 1 further comprising filtering the feedback control signal by a first order low pass filter.

10. The method according to claim 1 further comprising applying the steering feedback control signal to a motor for generating a motor steering signal that is combined with the steering command signal to provide the active front steering.

11. An active front steering system for a vehicle, said system comprising:
a yaw rate command sub-system responsive to a vehicle speed signal and a steering command signal, said yaw rate command sub-system generating a yaw rate command signal;
an understeer behavior sub-system responsive to the vehicle speed signal, the steering command signal and a vehicle lateral acceleration signal, said understeer behavior sub-system determining an understeer flag and an oversteer flag based on an understeer and oversteer behavior condition;
a vehicle understeer and oversteer control sub-system responsive to the understeer and oversteer flags, the vehicle speed signal and a vehicle yaw rate signal, said understeer and oversteer control sub-system generating a front steering feedback control signal, wherein the vehicle understeer and oversteer control sub-system determines a dead band where the aw rate error signal is below a predetermined threshold and does not provide the feedback control signal in the dead band; and
an active front steering actuator responsive to the steering command signal and the feedback control signal and generating an active front steering signal for steering the vehicle.

12. The system according to claim 11 wherein the vehicle understeer and oversteer control sub-system generates a proportional term, a derivative term and an integral term for a proportional-integral-derivative (PID) control for providing the feedback control signal.

13. The system according to claim 12 wherein the vehicle understeer and oversteer control sub-system determines the proportional term by multiplying a proportional gain by the yaw rate error signal, determines the derivative term by multiplying a derivative gain by a yaw acceleration error signal and determines the integral term by multiplying an integral gain by a vehicle yaw angle.

14. The system according to claim 13 wherein the vehicle understeer and oversteer control sub-system determines the proportional gain and the derivative gain from a look-up table based on the vehicle speed signal.

15. The system according to claim 13 wherein the vehicle understeer and oversteer control sub-system determines the integral term by subjecting the integral gain to a diminishing integrator function.

16. The system according to claim 13 wherein the vehicle understeer and oversteer control sub-system determines that the understeer flag is high and the oversteer flag is low, and then sets the understeer control to:

$$-K_{understeer\_gain}\{K_p\Delta\dot{\psi}+K_i\int\Delta\dot{\psi}+K_d\Delta\ddot{\psi}\}$$

where $K_{understeer\_gain}$ is the understeer gain, $K_p\Delta\dot{\psi}$ is the proportional term, $K_i\int\Delta\dot{\psi}$ is the integral term and $K_d\Delta\ddot{\psi}$ is the derivative term.

17. The system according to claim 13 wherein the vehicle understeer and oversteer control sub-system determines that the understeer flag is low and the oversteer flag is high, then sets the oversteer control to:

$$\{K_p\Delta\dot{\psi}+K_i\int\Delta\dot{\psi}+K_d\Delta\ddot{\psi}\}$$

where $K_p\Delta\dot{\psi}$ is the proportional term, $K_i\int\Delta\dot{\psi}$ is the integral term and $K_d\Delta\ddot{\psi}$ is the derivative term.

18. The system according to claim 11 wherein the vehicle understeer and oversteer control sub-system determines the dead band by determining a proportional term dead band based on the vehicle speed, determining a derivative term dead band based on a yaw acceleration of the vehicle and determining an integral term dead band based on integrating a yaw rate error dead band using a diminishing integrator function.

19. The system according to claim 11 further comprising a first order low pass filter for filtering the feedback control signal.

20. The system according to claim 11 wherein the actuator includes a motor responsive to the feedback control signal, said motor generating a motor steering signal that is combined with the steering command signal to provide the active front steering.

21. An active front steering system for a vehicle, said system comprising:
an understeer behavior sub-system for generating an understeer and oversteer signal indicative of the understeer and oversteer condition of the vehicle;
a vehicle understeer and oversteer control sub-system responsive to the understeer and oversteer signal and generating a front steering feedback control signal, wherein the vehicle understeer and oversteer control sub-system determines a dead band where the aw rate error signal is below a predetermined threshold and does not provide the feedback control signal in the dead band; and an active front steering actuator responsive to a steering command signal and the feedback control signal and generating an active front steering signal for steering the vehicle.

22. The system according to claim 21 wherein the vehicle understeer and oversteer control sub-system generates a proportional term, a derivative term and an integral term for a proportional-integral-derivative (PID) control for providing the feedback control signal.

23. The system according to claim 22 wherein the vehicle understeer and oversteer control sub-system determines the proportional term by multiplying a proportional gain by the yaw rate error signal, determines the derivative term by multiplying a derivative gain by a yaw acceleration error signal and determines the integral term by multiplying an integral gain by a vehicle yaw angle.

24. The system according to claim 23 wherein the vehicle understeer and oversteer control sub-system determines the proportional gain and the derivative gain from a look-up table based on the vehicle speed signal.

25. The system according to claim 23 wherein the vehicle understeer and oversteer control sub-system determines the integral term by subjecting the integral gain to a diminishing integrator function.

26. The system according to claim 23 wherein the vehicle understeer and oversteer control sub-system sets the understeer control to:

$$-K_{understeer\_gain}\{K_p \Delta \dot{\psi} + K_i \int \Delta \psi + K_d \Delta \ddot{\psi}\}$$

during an understeer condition, where $K_{understeer\_gain}$ is the understeer gain, $K_p \Delta \dot{\psi}$ is the proportional term, $K_i \int \Delta \psi$ is the integral term and $K_d \Delta \ddot{\psi}$ is the derivative term.

27. The system according to claim 23 wherein the vehicle understeer and oversteer control sub-system sets the oversteer control to:

$$\{K_p \Delta \dot{\psi} + K_i \int \Delta \psi + K_d \Delta \ddot{\psi}\}$$

during an oversteer condition, where $K_p \Delta \dot{\psi}$ is the proportional term, $K_i \int \Delta \psi$ is the integral term and $K_d \Delta \ddot{\psi}$ is the derivative term.

* * * * *